(12) United States Patent
Thomas et al.

(10) Patent No.: US 8,990,974 B2
(45) Date of Patent: Mar. 31, 2015

(54) OVERMOLDED FITTING CONNECTION WITH COLOR INDICATION

(75) Inventors: Kurt J. Thomas, Indianapolis, IN (US); Derek A. Brown, Lizton, IN (US); Brian A. Enlow, Noblesville, IN (US)

(73) Assignees: Masco Corporation of Indiana, Indianapolis, IN (US); Mercury Plastics, Inc., Middlefield, OH (US)

( * ) Notice: Subject to any disclaimer, the term of this patent is extended or adjusted under 35 U.S.C. 154(b) by 0 days.

(21) Appl. No.: 13/407,459

(22) Filed: Feb. 28, 2012

(65) Prior Publication Data
US 2012/0151673 A1 Jun. 21, 2012

Related U.S. Application Data

(62) Division of application No. 12/233,839, filed on Sep. 19, 2008, now Pat. No. 8,146,955.

(60) Provisional application No. 60/975,505, filed on Sep. 26, 2007.

(51) Int. Cl.
*A47L 19/04* (2006.01)
*F16L 41/00* (2006.01)
*F16L 19/025* (2006.01)
*F16L 47/04* (2006.01)

(52) U.S. Cl.
CPC ............ *F16L 41/001* (2013.01); *F16L 19/025* (2013.01); *F16L 47/04* (2013.01); *F16L 2201/60* (2013.01)
USPC ....................................... 4/675; 4/676; 4/677

(58) Field of Classification Search
USPC ............... 4/675–677; 285/249, 342, 343, 354
See application file for complete search history.

(56) References Cited

U.S. PATENT DOCUMENTS

| | | | |
|---|---|---|---|
| 2,344,698 A | 3/1944 | Howe | |
| 3,018,119 A | 1/1962 | Champion | |
| 3,831,983 A | 8/1974 | Stickler | |
| 3,857,591 A | 12/1974 | Voss | |
| 4,037,864 A * | 7/1977 | Anderson et al. | 285/342 |
| 4,067,534 A | 1/1978 | Frey | |
| 4,345,786 A * | 8/1982 | Egert | 285/124.4 |
| 5,060,689 A | 10/1991 | Csaszar et al. | |
| 5,180,195 A | 1/1993 | Petroff et al. | |
| 5,213,375 A | 5/1993 | Wu | |
| 5,353,843 A | 10/1994 | Hoag | |
| 5,370,424 A * | 12/1994 | Wendorff | 285/332.4 |
| 5,375,887 A | 12/1994 | Johnson | |
| 5,507,531 A | 4/1996 | Aldridge | |
| 5,887,912 A | 3/1999 | Nakamura | |
| 5,895,695 A | 4/1999 | Rowley | |
| 6,012,743 A | 1/2000 | Godeau et al. | |
| 6,082,780 A | 7/2000 | Rowley et al. | |
| 6,287,501 B1 | 9/2001 | Rowley | |
| 6,557,907 B2 | 5/2003 | Rowley | |
| 6,672,628 B2 | 1/2004 | Thomas et al. | |
| 6,722,708 B2 | 4/2004 | Morohoshi et al. | |
| 6,757,921 B2 * | 7/2004 | Esche | 4/677 |
| 6,783,160 B2 | 8/2004 | Rowley | |
| 6,902,210 B1 | 6/2005 | Rowley | |

(Continued)

*Primary Examiner* — Lauren Crane
(74) *Attorney, Agent, or Firm* — Faegre Baker Daniels LLP

(57) ABSTRACT

A overmold fitting is coupled to a fluid conduit. The overmold fitting may include a first portion and a spaced apart second portion proximate a first end of the fluid conduit. The first portion may be an end ring and the second portion may be a retention ring. The overmold fitting may include a visual indicator to provide an indication of the fluid to be used with the fluid conduit.

22 Claims, 5 Drawing Sheets

(56) References Cited

U.S. PATENT DOCUMENTS

| | | |
|---|---|---|
| 7,093,864 B2 | 8/2006 | Wasmuth |
| 7,213,845 B2 | 5/2007 | Sato et al. |
| 7,252,117 B1 | 8/2007 | Glenn |
| 8,146,955 B2 | 4/2012 | Thomas et al. |
| 2004/0090064 A1 | 5/2004 | Rowley |
| 2005/0194786 A1* | 9/2005 | McCord ............... 285/386 |
| 2007/0051418 A1 | 3/2007 | Rowles et al. |
| 2007/0271695 A1* | 11/2007 | Thomas et al. ............ 4/675 |
| 2008/0003148 A1* | 1/2008 | Dause ................. 422/102 |
| 2008/0178950 A1 | 7/2008 | Marty et al. |
| 2008/0178957 A1 | 7/2008 | Thomas et al. |
| 2008/0217918 A1 | 9/2008 | Preston |

\* cited by examiner

OVERMOLDED FITTING CONNECTION WITH COLOR INDICATION

CROSS-REFERENCE TO RELATED APPLICATIONS

This application is a divisional application of co-pending U.S. patent application Ser. No. 12/233,839, filed Sep. 19, 2008, which claims the benefit of U.S. Provisional Patent Application Ser. No. 60/975,505, filed Sep. 26, 2007, the disclosures of which are expressly incorporated by reference herein.

BACKGROUND

1. Field of the Invention

The present invention relates generally to water connections and in particular to water connections including an overmold component.

2. Prior Art

Water line connections are known. Referring to FIG. 1, a water line connection 10 is shown. Connection 10 includes a supply line 12 for a water device, such as a faucet. An end 14 of supply line 12 is received in a receptacle 16 of a compression fitting 18. Receptacle 16 either communicates water to supply line 12 or receives water from supply line 12. A diameter of an inner surface 20 of receptacle 16 is generally equal to a diameter of external surface 22 of supply line 12. An exemplary diameter of surface 22 is ⅜ of an inch. Supply line 12 is received in receptacle 16 such that end 14 abuts surface 24 of receptacle 16. A ferrule ring 30 is then captured between compression fitting 18 and a hollow nut retainer 32 forming both a compression gasket and a retention feature for supply line 12. Ferrule ring 30 may be made of plastic or metal. A compression gasket may be used in place of ferrule ring 30. Surface 22 of supply line 12 acts as a sealing surface for ferrule ring 30. Hollow nut retainer 32 includes internal threads 34 which mate with external threads 26 of compression fitting 18 to couple retainer 32 to fitting 18.

Referring to FIG. 2, another water line connection 50 is shown. A supply line 52 includes an overmold fitting 54 coupled thereto. The supply line may be made from a PEX material. A diameter of outer surface 56 of overmold fitting 54 is equal to the diameter of inner surface 20 of fitting 18. Since outer surface 56 is defined by overmold fitting 54, a diameter of outer surface 58 of supply line 52 is less than the diameter of inner surface 20 of fitting 18. The diameter of surface 56 and surface 20 is ⅜ of an inch and the diameter of surface 58 is 5/16 of an inch. In FIG. 1, an installer could cut supply line 12 to length and then make the connection. In FIG. 2, an installer could not cut supply line 52 to length and then make a connection with a traditional sized ferrule ring 30 (since overmold fitting 54 has been cut off) because the diameter of surface 58 is not equal to the diameter of surface 20 of fitting 18.

A gasket 60 is captured between overmold fitting 54 and fitting 18. As in FIG. 1, a hollow nut retainer 32 is coupled to fitting 18 to connect supply line 52 to receptacle 16 of fitting 18.

SUMMARY

In an exemplary embodiment of the present disclosure, a fluid conduit is provided with an overmold fitting which provides a visual indication of a characteristic of a fluid for use with the fluid conduit.

In another exemplary embodiment of the present disclosure, a supply line for coupling to a fitting having a receptacle is provided. The supply line including a fluid conduit having a first end, a second end, and a fluid passageway passing therethrough; an overmolded end ring coupled to the first end of the fluid conduit, the overmolded end ring permitting the passage of fluid into the fluid passageway of the fluid conduit; and an overmolded retention ring coupled to the fluid conduit proximate the first end and spaced apart from the overmolded end ring. In an example thereof, the supply line further including a seal received proximate the first end of the fluid conduit and a retainer received by the fluid conduit. The seal being generally positioned between the overmolded end ring and the overmolded retention ring and contacting an exterior surface of the fluid conduit. In a variation thereof, the fluid conduit is flexible. In a further variation thereof, the fluid conduit is made from a polymeric material. In yet a further variation thereof, the fluid conduit is made of a PEX material. In another example, at least one of the overmolded end ring and the overmolded retention ring includes a visual indicator to provide an indication of a characteristic of the fluid for use with the fluid conduit. In a variation thereof, a portion of the overmolded retention ring extends through an opening in the retainer in a direction away from the first end of the fluid conduit and the portion includes a visual indicator to provide an indication of a temperature of the fluid for use with the fluid conduit. In yet another example, at least one of the overmolded end ring and the overmolded retention ring includes a visual indicator to provide an indication of a temperature of the fluid for use with the fluid conduit. In still another example, the overmolded retention ring includes at least one protrusion which engages the retainer.

In a further exemplary embodiment of the present disclosure, a supply assembly for connection to a source of hot water, a source of cold water, and a valve assembly which receives hot water through a hot water inlet, receives cold water through a cold water inlet, and provides a mixed water output for a water delivery device through a mixed water outlet is provided. The supply assembly including a hot water supply line adapted to be coupled to the source of hot water, a cold water supply line adapted to be coupled to the source of cold water, a mixed water supply line adapted to be coupled to the water delivery device; and an overmolded puck coupled to the hot water supply line, the cold water supply line, and the mixed water supply line. The hot water supply line including an overmolded fitting having a visual indicator to identify the hot water supply line. The cold water supply line including an overmolded fitting having a visual indicator to identify the cold water supply line. The overmolded puck positioning the hot water supply line, the cold water supply line, and the mixed water supply line to be in fluid communication with the hot water inlet of the valve assembly, the cold water inlet of the valve assembly, and the mixed water outlet of the valve assembly, respectively. In an example thereof, a color of the overmolded fitting of the hot water supply line is the visual indicator of the hot water supply line. The color of the overmolded fitting of the hot water supply line differing from a color of the overmolded fitting of the cold water supply line. In a variation thereof, the color of the overmolded fitting of the hot water supply line is red and the color of the overmolded fitting of the cold water supply line is blue. In another example, the overmolded fitting of the hot water supply line is a two-piece overmolded fitting having a end ring and a retention ring spaced apart from the end ring and the overmolded fitting of the cold water supply line is a two-piece overmolded fitting having a end ring and a retention ring spaced apart from the end ring.

In yet another exemplary embodiment of the present disclosure, a supply line for coupling to a fitting having a receptacle is provided. The supply line including a fluid conduit having a first end, a second end, and a fluid passageway passing therethrough; and an overmolded fitting positioned proximate the first end of the fluid conduit. The overmolded fitting providing a visual indicator to provide an indication of a temperature of the fluid for use with the fluid conduit. The overmolded fitting having a first portion and a second portion spaced apart from the first portion. In an example thereof, the fluid conduit is generally cylindrical and includes a generally cylindrical exterior surface and the first portion of the overmolded fitting has a generally cylindrical exterior surface having a diameter generally matching a diameter of the generally cylindrical exterior surface of the fluid conduit. In a variation thereof, the first portion is an end ring coupled to an axial surface of the fluid conduit at the first end. In another example thereof, the first portion is coupled to an axial surface of the first end of the fluid conduit and the second portion is coupled to an exterior surface of the fluid conduit. In a variation thereof, the second portion of the overmold fitting is spaced apart from the first portion of the overmold fitting exposing the exterior surface of the fluid conduit in a region between the first portion of the overmold fitting and the second portion of the overmold fitting.

In still another exemplary embodiment of the present disclosure, a method of coupling a supply line to a compression fitting is provided. The method comprising the step of providing a supply line having an overmolded fitting including a first end portion and a second portion spaced apart along the supply line from the first portion. The overmolded fitting corresponding to a first end of the supply line. The supply line having an outer diameter generally equal to an inner diameter of the compression fitting. The method further comprising the steps of removing a length of the supply line including the overmolded fitting; placing a sealing member over an end of the remaining supply line; inserting the remaining supply line into the compression fitting; and tightening a retainer, the sealing member sealing the connection between the supply line and the compression fitting and acting as a retention feature for the supply line. In an example thereof, the sealing member is a ferrule ring. In another example thereof, the sealing member is a gasket.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to the precise forms disclosed. Rather, the embodiments selected for description have been chosen to enable one skilled in the art to practice the invention. Although the disclosure is described in connection with water, it should be understood that additional types of fluids may be used.

Figure 3:
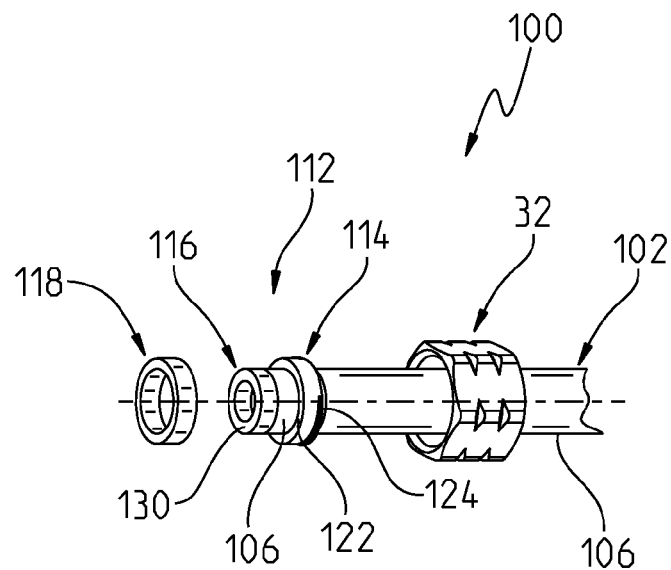
FIG. 3 is a perspective view of a supply line including a connector having a overmolded fitting including a retention ring and a end ring coupled to the supply line, a seal, and a retainer.
Figure 4:
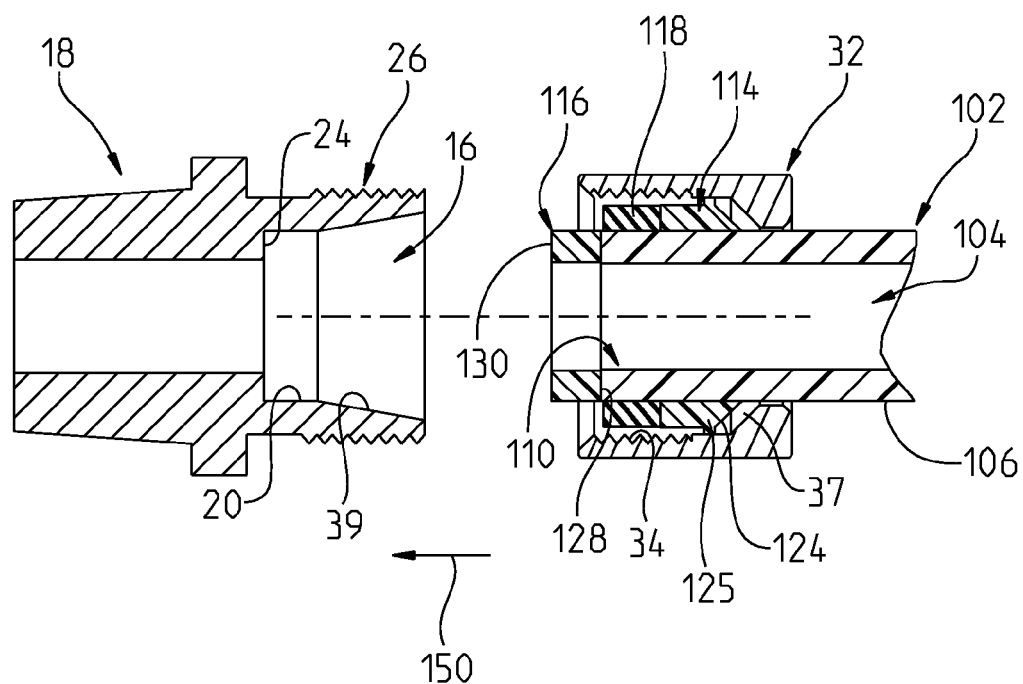
FIG. 4 is a cross sectional view of FIG. 3 and a supply stop fitting.

Referring to FIG. 3, a connector 100 for a supply line 102 is shown. Supply line 102 includes a fluid passageway 104 (see FIG. 4) extending therethrough and has an outer surface 106 having a diameter generally equal to the diameter of inner surface 20 of receptacle 16 of fitting 18. As shown in FIG. 3, a portion of surface 106 is exposed proximate a first end 110 of supply line 102.

In one embodiment, supply line 102 is generally flexible and made from a non-metallic material. As such, the supply line 102 is electrically non-conductive. In one embodiment, supply line 102 is a polymer. While in one illustrative embodiment, the supply line 102 is formed of a cross-linked polyethylene (PEX), it should be appreciated that other polymers may be substituted therefor. For example, the supply line 102 may be formed of any polyethylene (PE) (such as raised temperature resistant polyethylene (PE-RT)), of polypropylene (PP) (such as polypropylene random (PPR)), or of polybutylene (PB). It is further envisioned that the supply line 102 may be formed of cross-linked polyvinyl chloride (PVCX) using silane free radical initiators, of cross-linked polyurethane, or of cross-linked propylene (XLPP) using peroxide or silane free radical initiators.

Connector 100 includes an overmolded fitting 112. In the illustrated embodiment, the overmolded fitting 112 includes a first overmolded portion 114 and a second, spaced apart, overmolded portion 116. In alternative embodiments, overmold fitting 112 includes a single portion or more than two separate portions. Connector 100 further includes a sealing member 118 and a retainer 32. Exemplary seals 118 include gaskets, o-rings, and other suitable seals. Exemplary retainers 32 include a hollow nut retainer and other suitable retainers.

Additional information regarding overmolded components are provided in U.S. Pat. No. 5,895,695; U.S. Pat. No. 6,082,780; U.S. Pat. No. 6,287,501; U.S. Pat. No. 6,557,907; U.S. Pat. No. 6,902,210; U.S. Pat. No. 7,766,043; and U.S. Pat. No. 7,806,141, the disclosures of which are expressly incorporated by reference herein. Further, connector 100 may be used with the components disclosed in U.S. Pat. No. 7,766,043, and U.S. Pat. No. 7,806,141, the disclosures of which are expressly incorporated by reference herein.

First overmold portion 114 includes an axial surface 122, extending transversely to surface 106 of supply line 102 and which provides a stop for sealing member 118. First overmold portion 114 further includes an angled surface 124 which generally mates with a surface 37 of retainer 32. First overmold portion 114 is captured between retainer 32 and fitting 18 when threads 34 of retainer 32 engage threads 26 of fitting 18 to retain supply line 102 relative to fitting 18. As such, first overmold portion 114 functions as a retaining or retention ring of connector 100.

Second overmold portion 116 is coupled to an axial surface 128 of supply line 102 and has an outer diameter generally equal to the diameter of surface 106 of supply line 102. In one embodiment, an end surface 130 of second overmold portion 116 contacts surface 24 of fitting 18 when supply line 102 is coupled to fitting 18. In one embodiment, an end surface 130 of second overmold portion 116 is spaced apart from surface 24 of fitting 18 when supply line 102 is coupled to fitting 18. Second overmold portion 116 is an end ring of connector 100.

In one embodiment overmold fitting 112 is made of a glass filled polyethylene. Overmold fitting 112 may be made of other materials including PEX, polyethylene, polypropylene, and nylon filled with glass fiber, glass beads, carbon fiber, aramid fibers, minerals (such as talc) or metallic fibers (such as stainless steel).

Connector 100 assembles supply line 102 to fitting 18. In one embodiment, fitting 18 provides water to supply line 102. In one embodiment, supply line 102 provides water to fitting 18. Regardless, to assemble supply line 102 to fitting 18, second overmold portion 116 of overmold fitting 112 is positioned in receptacle 16 of fitting 18 and advanced until end surface 130 of second overmold portion 116 contacts surface 24 of fitting 18 or until seal 118 or first overmold portion 114 provides adequate resistance to further advancement due to its contacting sealing surface 39 of fitting 18.

In one embodiment, seal 118 is present and supply line 102 may be assembled to fitting 18 by finger tightening retainer 32. In one embodiment, seal 118 is omitted and supply line 102 may be assembled to fitting 18 by tightening retainer 32 such that first overmold portion 114 contacts and seals against sealing surface 39 of fitting 18. In both cases end surface 130 of overmold portion 116 should not contact surface 24 of fitting 18 until an appropriate seal has been made between one of seal 118 or first overmold portion 114 and sealing surface 39 of fitting 18.

Returning to the assembly of supply line 102 to fitting 18, threads 34 of retainer 32 are engaged with threads 26 of fitting 18 and retainer 32 is advanced generally in direction 150. As retainer 32 is advanced in direction 150, surface 124 of first overmold portion 114 of overmolded fitting 112 contacts surface 37 of retainer 32 thereby also advancing supply line 102 in direction 150. The advancement in direction 150 further compresses seal 118 (or first overmold portion 114). In one embodiment, surface 130 provides a positive indication to stop advancement in direction 150 due to its contact with surface 24.

Figure 1:
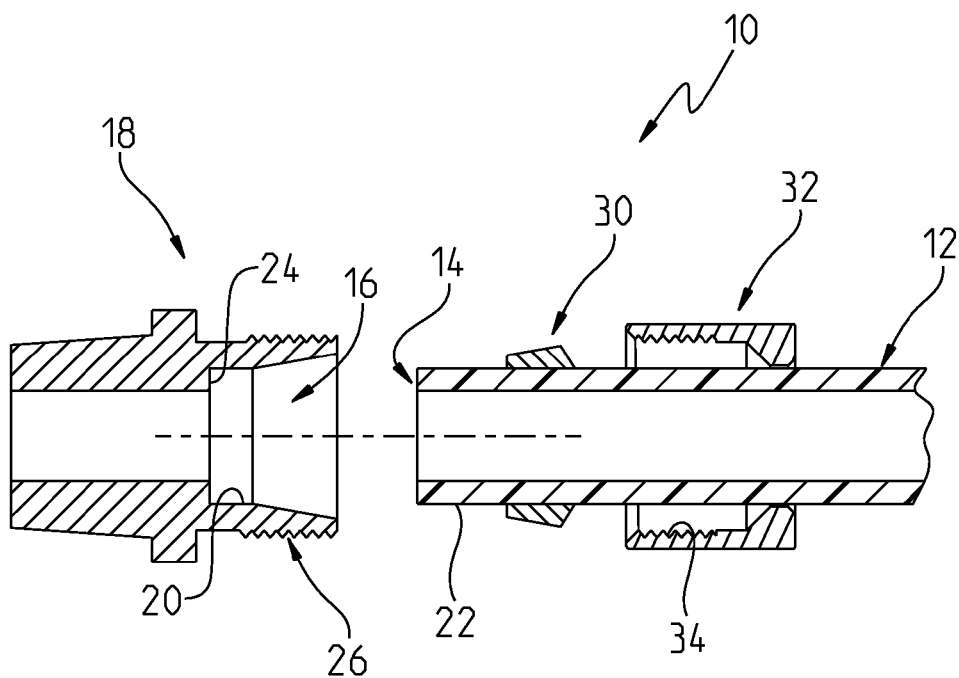
FIG. 1 is prior art water connection including a supply stop fitting, a supply tube, a ferrule ring, and a retainer.
Figure 2:
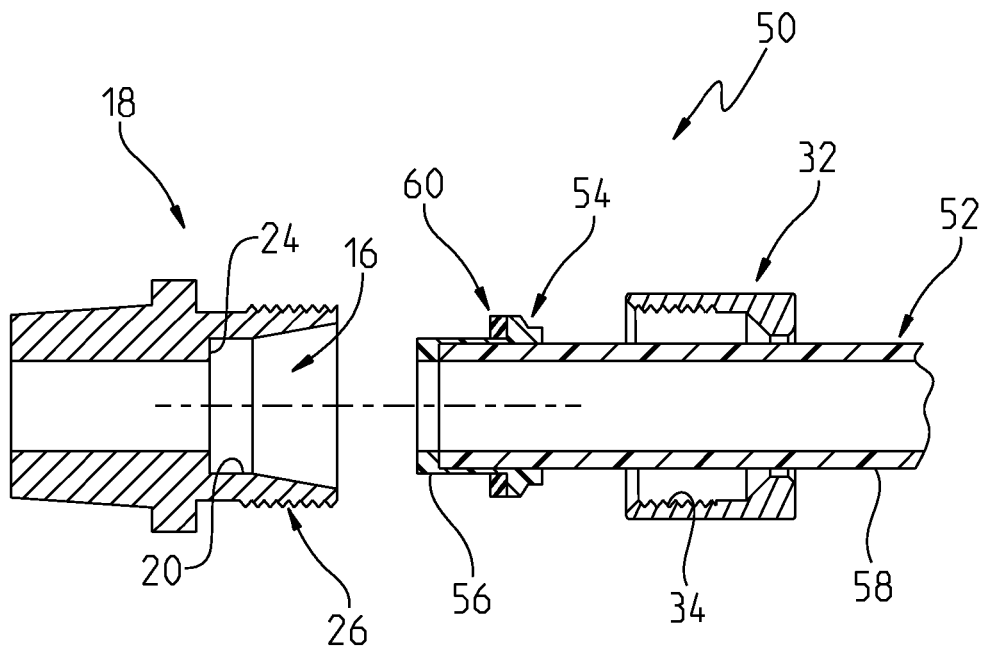
FIG. 2 is prior art water connection including a supply stop fitting, a supply tube, an overmold fitting, and a retainer.

Seal 118 seals against surface 39 of fitting 18 and against surface 106 of supply tube 102 to prevent the flow of water other than from one of fitting 18 and supply line 102 to the other of fitting 18 and supply line 102. By sealing directly against surface 106 of supply tube 102 a leak between the overmold and the supply tube is not an issue. Such is not the case in the prior art device shown in FIG. 2.

Further, by using surface 106 as the sealing surface for seal 118 then supply tube 102 may be cut to a different length and a traditional sized ferrule ring 30 or seal 118 may be used therewith. This allows an installer to use overmold fitting 112 when supply line 102 is generally the correct length and to cut off overmold fitting 112 and use traditional methods when supply line 102 is too long. An exemplary method of coupling a supply line to a compression fitting includes the steps of: providing a supply line having an overmolded fitting corresponding to a first end of the supply line, the supply line having an outer diameter generally equal to an inner diameter of the compression fitting; removing a length of the supply line including the overmolded fitting; placing a sealing member over an end of the remaining supply line; inserting the remaining supply line into the compression fitting; and tightening a retainer. The sealing member sealing the connection between the supply line and the compression fitting and acting as a retention feature for the supply line.

By having first overmold portion 114 bounded by surface 106 on both sides, the strength of the coupling between first overmold portion 114 and supply line 102 is believed to be increased. This makes it more difficult to separate supply tubing 102 from overmold fitting 112. Further, improved shutoff relative to the mold is believed to be achieved.

Figure 5:
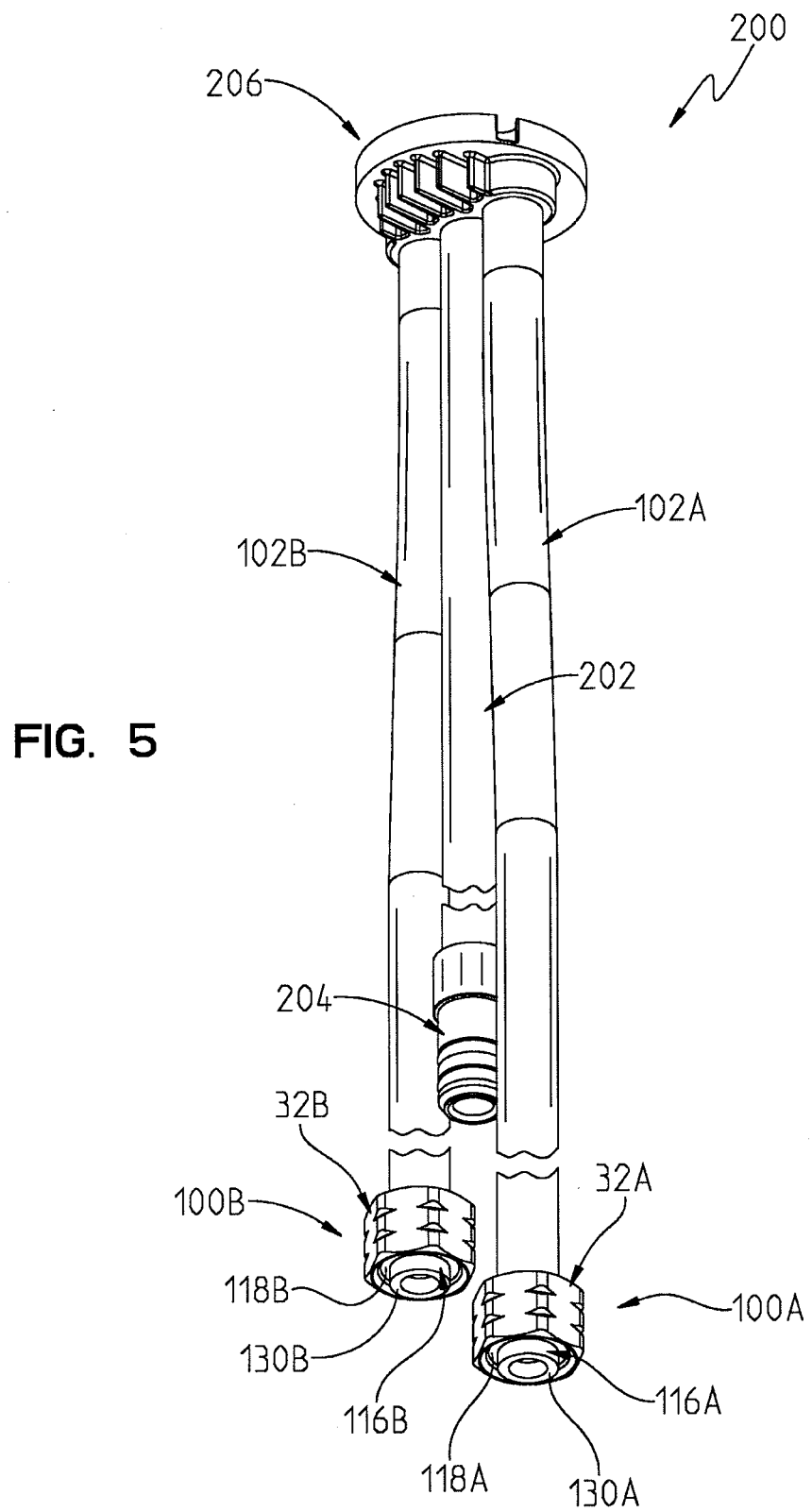
FIG. 5 is a perspective view of a supply assembly for a faucet including a hot water supply line having a connector of FIG. 3, a cold water supply line having a connector of FIG. 3, a mixed water outlet line, and a overmolded puck coupled to the hot water supply line, the cold water supply line, and the mixed water outlet line.

In one embodiment, overmolded fitting 112 includes a visual indicator which identifies the corresponding supply line 102 as a hot water supply line or a cold water supply line. In one embodiment, the visual indicator is a color of the overmolded fitting. One or both of overmold portion 114 and overmold portion 116 have a corresponding color to act as the visual indicator. As shown in FIG. 5, during installation first overmold portion 114 of overmold fitting 112 is generally obscured from view due to retainer 32 and seal 118. As such, in a preferred embodiment, overmold portion 116 has a corresponding color to act as the visual indicator. Generally both overmold portion 114 and overmold portion 116 are formed such that a single material is used during the molding operation.

Figure 7:
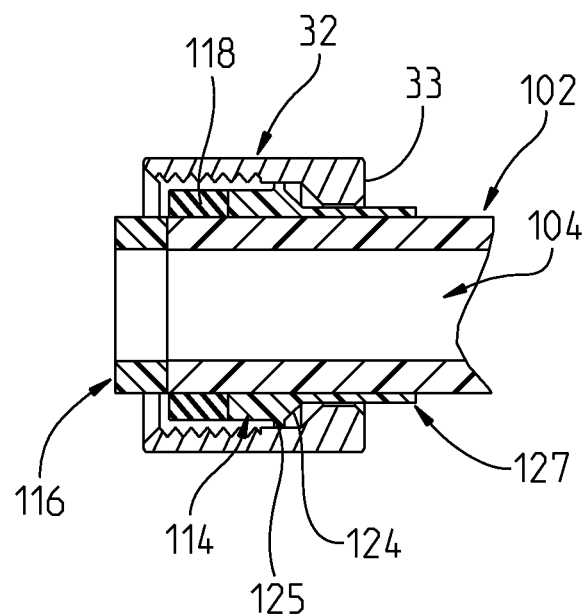
FIG. 7 is a cross sectional view of another exemplary connector.

In one embodiment, illustratively shown in FIG. 7, a portion 127 of overmold portion 114 extends outside of retainer 32, illustratively above retainer 32. Portion 127 may include a visual indictor to identify the corresponding supply line 102 as a hot water supply line or a cold water supply line. In one embodiment, the visual indicator of portion 127 is a color of portion 127. Second overmold portion 116 is shown in FIG. 7. In one embodiment, second overmold portion 116 may be omitted because portion 127 provides the visual indicator of the identity of supply line 102.

Figure 8:
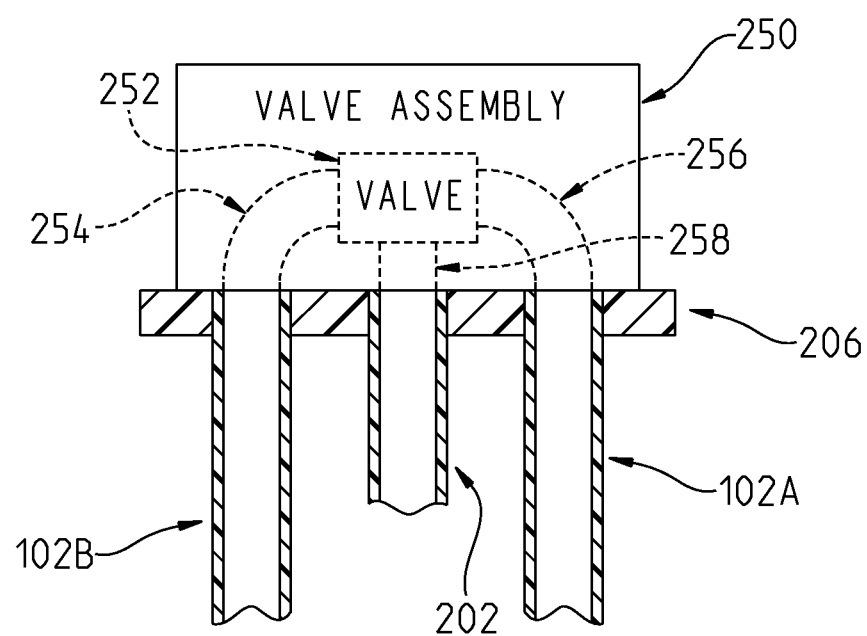
FIG. 8 is a representative view of the supply assembly of FIG. 5 and a valve assembly.

Referring to FIG. 5, a supply assembly 200 is shown. Supply assembly 200 includes a hot water supply line 102A, a cold water supply line 102B, a mixed water supply line 202 and a overmolded puck 206. Mixed water supply line 202 includes a fitting 204 and is coupled to a water delivery device, such as a faucet aerator. Puck 206 is coupled to hot water supply line 102A, cold water supply line 102B, and mixed water supply line 202. As represented in FIG. 8, puck 206 positions the hot water supply line 102A, the cold water supply line 102B, and the mixed water supply line 202 to be in fluid communication with a hot water inlet 256 of a valve assembly 250, a cold water inlet 254 of the valve assembly 250, and a mixed water outlet 258 of the valve assembly 250, respectively. Cold water inlet 254 and hot water inlet 256 provide cold water and hot water, respectively, to a valve 252 from which mixed water is provided to mixed water outlet 258. Additional details regarding puck 206, the corresponding valve assemblies used with puck 206, and exemplary water delivery devices are provided in U.S. Pat. No. 7,766,043, the disclosure of which is expressly incorporated by reference herein.

Hot water supply line 102A and cold water supply line 102B include a respective connector 100A and 100B. Further, the respective second overmold portion 116A and 116B of supply lines 102A and 102B are color coded to indicate the identity of the respective supply line 102A and 102B. In one embodiment, the overmold portion 116A of hot water supply line 102A is red and the overmold portion 116B of cold water supply line 102B is blue.

In one embodiment, one or more of supply lines 102A, 102B and mixed water supply line 202 are flexible lines. In one embodiment, one or more of supply lines 102A, 102B and mixed water supply line 202 are flexible, corrugated lines. Exemplary corrugated lines include corrugated PEX lines. In one embodiment, corrugated PEX lines with overbraiding is used for one or more of supply lines 102A, 102B and mixed water supply line 202. Additional details regarding corrugated PEX lines with overbraiding are disclosed in US Patent Application Publication No. 2008/0178957, the disclosure of which is expressly incorporated by reference herein.

Figure 6:
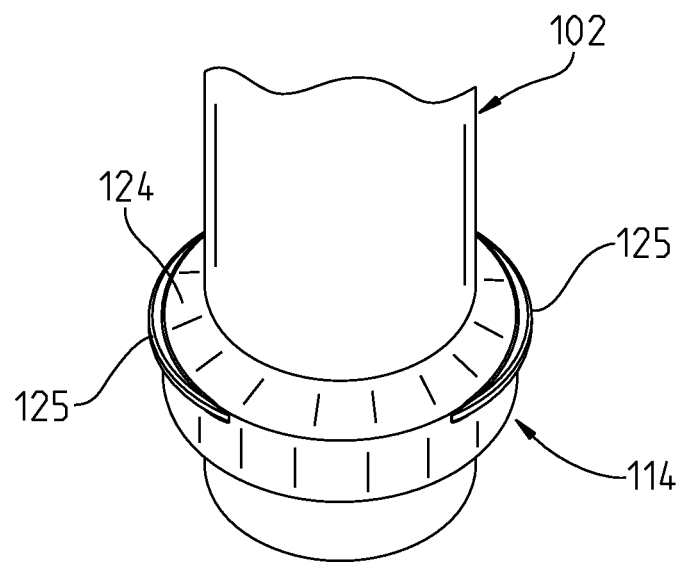
FIG. 6 is a perspective view of the supply line and retention ring of FIG. 3.

Referring to FIG. 6, overmold portion 114 includes a protrusion 125 which engages retainer 32 to retain retainer 32 on fitting 112. In the illustrated embodiment, protrusion 125 is formed as two separate protrusions. Fewer or more separate protrusions may be used. Protrusion 125 engages with threads 34 of retainer 32 and retainer 32 is threaded onto protrusion 125.

Although the invention has been described in detail with reference to certain preferred embodiments, variations and modifications exist within the spirit and scope of the invention as described and defined in the following claims.

The invention claimed is:

1. A supply assembly for connection to a source of hot water, a source of cold water, and a valve assembly which receives hot water through a hot water inlet, receives cold water through a cold water inlet, and provides a mixed water output for a water delivery device through a mixed water outlet, the supply assembly including:
a hot water supply line adapted to be coupled to the source of hot water, the hot water supply line including a first end and a second end, and an overmolded fitting overmolded with the first end of the hot water supply line and having a visual indicator to identify the hot water supply line;
a cold water supply line adapted to be coupled to the source of cold water, the cold water supply line including a first end and a second end, and an overmolded fitting overmolded with the first end of the cold water supply line and having a visual indicator to identify the cold water supply line;
a mixed water supply line including a first end and a second end, the second end adapted to be coupled to the water delivery device; and
an overmolded puck overmolded around and coupled to the second end of the hot water supply line, the second end of the cold water supply line, and the first end of the mixed water supply line, the overmolded puck positioning the hot water supply line, the cold water supply line, and the mixed water supply line to be in fluid communication with the hot water inlet of the valve assembly, the cold water inlet of the valve assembly, and the mixed water outlet of the valve assembly, respectively;
wherein the overmolded fitting of the hot water supply line is a two-piece overmolded fitting having an end ring proximal to the first end of the hot water supply line and a retention ring spaced apart from the end ring distally of the end ring, an outer diameter of the end ring of the hot water supply line being less than an outer diameter of the retention ring of the hot water supply line, and the outer diameter of the retention ring of the hot water supply line being greater than an outer diameter of the hot water supply line, and
the overmolded fitting of the cold water supply line is a two-piece overmolded fitting having an end ring proximal to the first end of the cold water supply line and a retention ring spaced apart from the end ring distally of the end ring, an outer diameter of the end ring of the cold water supply line being less than an outer diameter of the retention ring of the cold water supply line, and the outer diameter of the retention ring of the cold water supply line being greater than an outer diameter of the cold water supply line.

2. The supply assembly of claim 1, wherein a color of the overmolded fitting of the hot water supply line is the visual indicator of the hot water supply line, the color of the overmolded fitting of the hot water supply line differing from a color of the overmolded fitting of the cold water supply line.

3. The supply assembly of claim 2, wherein the color of the overmolded fitting of the hot water supply line is red and the color of the overmolded fitting of the cold water supply line is blue.

4. The supply assembly of claim 1, wherein:
the end ring of the hot water supply line is coupled to an axial surface of the hot water fluid line at the first end thereof; and
the end ring of the cold water supply line is coupled to an axial surface of the cold water fluid line at the first end thereof.

5. The supply assembly of claim 4, wherein the retention ring of the hot water supply line is coupled to an exterior surface thereof, and the retention ring of the cold water supply line is coupled to an exterior surface thereof.

6. The supply assembly of claim 1, further comprising:
a first seal generally positioned between the end ring and the retention ring of the hot water supply line and contacting an exterior surface of the hot water supply line;
a first retainer received by the hot water supply line;
a second seal generally positioned between the end ring the and the retention ring of the cold water supply line and contacting an exterior surface of the cold water supply line; and
a second retainer received by the cold water supply line.

7. The supply assembly of claim 6, wherein a portion of the retention ring of the hot water supply line extends through an opening in the first retainer and includes a visual indicator to provide an indication of a temperature of the fluid for use with the hot water supply line, and a portion of the retention ring of the cold water supply line extends through an opening in the second retainer and includes a visual indicator to provide an indication of a temperature of the fluid for use with the cold water supply line.

8. The supply assembly of claim 1, wherein each of the overmolded puck, the hot water supply line, the cold water supply line, and the mixed water supply line are each formed of a polymer.

9. The supply assembly of claim 8, wherein the polymers of the overmolded puck, the hot water supply line, the cold water supply line, and the mixed water supply line are cross-linked.

10. A supply assembly for connection to a source of water, the supply assembly including:
a first fluid conduit having an outer diameter, a first end, a second end, and a fluid passageway passing therethrough;
a retainer slidably mounted along the first fluid conduit;
a first overmolded fitting positioned proximate the first end of the first fluid conduit and adapted to be coupled to the retainer, the first overmolded fitting providing a visual indicator to provide an indication of a temperature of the fluid for use with the first fluid conduit, the first overmolded fitting having an overmolded end ring and an overmolded retention ring spaced apart from the end ring, wherein the end ring has an outer diameter and the retention ring has an outer diameter, the outer diameter of the end ring conforming to the outer diameter of the first fluid conduit and being less than the outer diameter of the retention ring, the retention ring being captured within the retainer when the retainer is coupled to the fitting; and an overmolded puck overmolded proximate the second end of the first fluid conduit.

11. The supply assembly of claim 10, wherein the first portion is an end ring coupled to an axial surface of the first fluid conduit at the first end.

12. The supply assembly of claim 10, wherein the first portion is coupled to an axial surface of the first end of the first fluid conduit and the second portion is coupled to an exterior surface of the first fluid conduit.

13. The supply assembly of claim 12, wherein the second portion of the overmold fitting is spaced apart from the first portion of the overmold fitting exposing the exterior surface of the first fluid conduit in a region between the first portion of the overmold fitting and the second portion of the overmold fitting.

14. The supply assembly of claim 10, further comprising:
a second fluid conduit having a first end, a second end, and a fluid passageway passing therethrough;
a second overmolded fitting positioned proximate the first end of the second fluid conduit, the second overmolded fitting providing a visual indicator to provide an indication of a temperature of fluid for use with the second fluid conduit, the second overmolded fitting having a first portion and a second portion spaced apart from the first portion; and
wherein the overmolded puck is coupled proximate the second end of the second fluid conduit, a color of the first overmolded fitting is the visual indicator of the first fluid conduit, and a color of the second overmolded fitting is the visual indicator of the second fluid conduit and different from the color of the first overmolded fitting.

15. The supply assembly of claim 14, wherein the color of the first overmolded fitting is red, and the color of the second overmolded fitting is blue.

16. The supply assembly of claim 14, wherein each of the overmolded puck, the first fluid conduit, the first overmolded fitting, the second fluid conduit, and the second overmolded fitting are formed of a polymer.

17. The supply assembly of claim 16, wherein the polymers of the overmolded puck, the first fluid conduit, the first overmolded fitting, the second fluid conduit, and the second overmolded fitting are cross-linked.

18. A supply assembly for connection to a source of water, the supply assembly including:
a hot water conduit having an outer diameter, a first end, a second end, and a fluid passageway passing therethrough;
a hot water fitting positioned proximate the first end of the hot water conduit, the hot water fitting providing a visual indicator to identify the hot water conduit, the hot water fitting having an end ring and a retention ring spaced apart from the end ring, wherein the end ring has an outer diameter and the retention ring has an outer diameter, the outer diameter of the end ring conforming to the outer diameter of the hot water conduit and being less than the outer diameter of the retention ring, a color of the hot water fitting being the visual indicator of the hot water conduit;
a cold water conduit having an outer diameter, a first end, a second end, and a fluid passageway passing therethrough;
a cold water fitting positioned proximate the first end of the cold water conduit, the cold water fitting providing a visual indicator to identify the cold water conduit, the cold water fitting having an end ring and a retention ring spaced apart from the end ring, wherein the end ring has an outer diameter and the retention ring has an outer diameter, the outer diameter of the end ring conforming to the outer diameter of the cold water conduit and being less than the outer diameter of the retention ring, a color of the cold water fitting being the visual indicator of the cold water conduit, the color of the hot water fitting differing from the color of the cold water fitting; and
a valve interface coupled to the second end of the hot water conduit, and the second end of the cold water conduit.

19. The supply assembly of claim 18, wherein the hot water fitting is overmolded with the hot water conduit, and the cold water fitting is overmolded with the cold water conduit.

20. The supply assembly of claim 18, wherein the valve interface comprises an overmolded puck.

21. The supply assembly of claim 18, where the color of the hot water fitting is red, and the color of the cold water fitting is blue.

22. The supply assembly of claim 18, further comprising a first retainer slidably mounted along the hot water conduit and adapted to be coupled to the hot water fitting, and a second retainer slidably mounted along the cold water conduit and adapted to be coupled to the cold water fitting.

* * * * *

UNITED STATES PATENT AND TRADEMARK OFFICE
CERTIFICATE OF CORRECTION

PATENT NO. : 8,990,974 B2
APPLICATION NO. : 13/407459
DATED : March 31, 2015
INVENTOR(S) : Kurt J. Thomas et al.

Page 1 of 1

It is certified that error appears in the above-identified patent and that said Letters Patent is hereby corrected as shown below:

In the Claims:

Claim 6, Column 8, line 32, please replace "the end ring the" with -- the end ring --.

Signed and Sealed this
Twenty-first Day of July, 2015

Michelle K. Lee
*Director of the United States Patent and Trademark Office*